(12) United States Patent
Kimata et al.

(10) Patent No.: US 12,209,526 B2
(45) Date of Patent: Jan. 28, 2025

(54) HONEYCOMB STRUCTURE AND EXHAUST GAS PURIFYING DEVICE

(71) Applicant: NGK INSULATORS, LTD., Nagoya (JP)

(72) Inventors: Takafumi Kimata, Nagoya (JP); Yukio Miyairi, Nagoya (JP); Masaaki Masuda, Nagoya (JP); Kazuya Hosoda, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 729 days.

(21) Appl. No.: 17/460,756

(22) Filed: Aug. 30, 2021

(65) Prior Publication Data
US 2021/0388749 A1    Dec. 16, 2021

Related U.S. Application Data

(63) Continuation of application No. PCT/JP2020/005372, filed on Feb. 12, 2020.

(30) Foreign Application Priority Data

Mar. 27, 2019  (JP) ................. 2019-061672

(51) Int. Cl.
F01N 3/28      (2006.01)
B01D 39/20     (2006.01)
(Continued)

(52) U.S. Cl.
CPC ....... F01N 3/2828 (2013.01); B01D 39/2068 (2013.01); B01D 46/2429 (2013.01);
(Continued)

(58) Field of Classification Search
None
See application file for complete search history.

(56) References Cited

U.S. PATENT DOCUMENTS

2016/0271549 A1    9/2016  Kikuchi
2016/0281562 A1*   9/2016  Miyairi ................. F01N 3/2066
2017/0022868 A1    1/2017  Crawford et al.

FOREIGN PATENT DOCUMENTS

JP    11336534 A    * 12/1999
JP    H11-336534 A1   12/1999
(Continued)

OTHER PUBLICATIONS

Yasuda A. JPH11336534A—translated document (Year: 1999).*
(Continued)

Primary Examiner — Jelitza M Perez
(74) Attorney, Agent, or Firm — BURR PATENT LAW, PLLC

(57) ABSTRACT

A pillar shaped honeycomb structure, including: an outer peripheral wall; and a porous partition wall disposed inside the outer peripheral wall, the a porous partition wall defining a plurality of cells, each of the cells extending from one end face to other end face to form a flow path, wherein a surface of the porous partition wall in the cells comprise a collecting layer having an average pore diameter lower than that of the porous partition wall; and wherein magnetic particles having a Curie point of 700° C. or higher are provided either or both between the surfaces of the porous partition wall and the collecting layer, and on the collecting layer.

12 Claims, 7 Drawing Sheets

(51) Int. Cl.
  *B01D 46/24* (2006.01)
  *B01D 53/94* (2006.01)
  *C04B 38/00* (2006.01)
(52) U.S. Cl.
  CPC . *B01D 46/24491* (2021.08); *B01D 46/24492* (2021.08); *B01D 46/24494* (2021.08); *B01D 46/2474* (2013.01); *B01D 46/248* (2021.08); *B01D 46/2482* (2021.08); *B01D 53/94* (2013.01); *C04B 38/0006* (2013.01); *C04B 38/0054* (2013.01); *C04B 38/0058* (2013.01); *C04B 38/0096* (2013.01); B01D 2255/9155 (2013.01); *F01N 2330/06* (2013.01); *F01N 2370/02* (2013.01)

(56) References Cited

FOREIGN PATENT DOCUMENTS

| JP | 2003-164765 A1 | 6/2003 |
| JP | 2006-057584 A1 | 3/2006 |
| JP | 2010-013945 A1 | 1/2010 |
| JP | 2016-175045 A1 | 10/2016 |
| JP | 2016-182536 A1 | 10/2016 |
| WO | 2016/021186 A1 | 2/2016 |

OTHER PUBLICATIONS

Ligan, Diesel Vehicle Exhaust, Exhaust Treatment Technology, Defense Industry Press, Jul. 31, 2016, pp. 273-274 (3 pages).
Chinese Office Action (Application No. 202080016544.0) dated Nov. 18, 2022 (with English translation).
Zou Ningyu, et al., *Application Technology of Thermal Insulation Materials*, Sinopec Press, Sep. 30, 2005, p. 54.
Chinese Decision of Final Rejection (Application No. 2020800165440) dated Feb. 27, 2023 (with English translation).
International Preliminary Report and Written Opinion (Application No. PCT/JP2020/005372) dated Mar. 31, 2020.
English translation of the International Preliminary Report on Patentability (Chapter I) dated Oct. 7, 2021 (Application No. PCT/JP2020/005372).

* cited by examiner

HONEYCOMB STRUCTURE AND EXHAUST GAS PURIFYING DEVICE

FIELD OF THE INVENTION

The present invention relates to a honeycomb structure and an exhaust gas purifying device. More particularly, the present invention relates to a honeycomb structure and an exhaust gas purifying device, which have an improved combustion efficiency of carbon particulates and the like due to induction heating and have a suppressed increase in pressure loss.

BACKGROUND OF THE INVENTION

There is an increased need for reduction of harmful components (HC, NOx, CO) in automobile exhaust gas. At present, the harmful components to be discharged are discharged during a period immediately after starting an engine, i.e., a period during which a catalyst temperature is lower and an activity of the catalyst is insufficient. To address this problem, Patent Literature 1 discloses a technique for inserting a magnetic wire into a part of cells of a cordierite honeycomb which is widely used as a catalyst supported honeycomb, and passing an electric current through a coil on an outer circumference of the honeycomb to cause induction heating, thereby increasing a temperature of the wire. According to this technique, a temperature of the honeycomb can be increased by the induction heating, and the catalyst can be supported on the honeycomb itself to maintain the catalytic activity, or a gas flowing through the heated honeycomb can be heated to heat the catalyst honeycomb located downstream.

Exhaust carbon particulates from diesel engines and gasoline engines are affected on human health, so that there is also an increased need for reduction of those particulates. To address them, Patent Literature 2 uses a wall-flow type filter of a honeycomb structure alternately plugged, and discloses a technique for providing a collecting layer for collecting particulate matters on surfaces of partition walls of the honeycomb structure filter.

Carbon particulates (soot) collected by the filter are burned out and removed by increasing a temperature of the exhaust gas. However, if a time required for the combustion removal is longer, there causes a problem that consumption of a fuel required for increasing the temperature of the exhaust gas increases. To address this problem, Patent Literature 3 discloses a technique for dispersedly arranging magnetic fine particles on surfaces of partition walls of a filter and heating them by electromagnetic induction heating.

CITATION LIST

Patent Literatures

[Patent Literature 1] U.S. Patent Application Publication No. 2017/0022868 A1
[Patent Literature 2] Japanese Patent Application Publication No. 2016-175045 A
[Patent Literature 3] WO 2016/021186 A1

SUMMARY OF THE INVENTION

However, as a result of studies, the present inventors have found that although when the technique disclosed in Patent Literature 1 is applied to a catalyst supported honeycomb or a honeycomb structure filter, a heating efficiency is increased as the number of cells into which a metal wire is inserted is increased, the number of cells that can be used as gas flow paths are reduced and areas of the fluid flow paths are reduced, thereby causing a significant increase in pressure loss.

Further, in the technique described in Patent Literature 2 or 3, the carbon particulates collected by the honeycomb structure filter may be penetrated into a honeycomb base material from the surfaces of the partition walls, which may deteriorate a combustion efficiency of the carbon particulates and also may cause an increase in pressure loss of the filter.

In view of those circumstances, an object of the present invention is to provide a honeycomb structure and an exhaust gas purifying device, which have an improved combustion efficiency for carbon particulates due to induction heating and have a suppressed increase in pressure loss.

As a result of intensive studies, the present inventors have found that the above problems can be solved by configuring a honeycomb structure to include collecting layers on surfaces of partition walls of the honeycomb structure, the cells serving as flow paths for a fluid, each collecting layer having a lower average pore diameter than that of each of the partition walls, and to provide magnetic particles each having a Curie point of 700° C. or more either or both between the surfaces of the partition wall and the collecting layer, and on the collecting layer. That is, the present invention is specified as follows:

(1) A pillar shaped honeycomb structure, comprising:
an outer peripheral wall; and
a porous partition wall disposed inside the outer peripheral wall, the porous partition wall defining a plurality of cells, each of the cells extending from one end face to other end face to form a flow path,
wherein a surface of the porous partition wall in the cells comprise a collecting layer having an average pore diameter lower than that of the porous partition wall; and
wherein magnetic particles having a Curie point of 700° C. or higher are provided either or both between the surfaces of the porous partition wall and the collecting layer, and on the collecting layer.
(2) An exhaust gas purifying device, comprising:
the honeycomb structure according to (1);
a coil wiring that spirally surrounds an outer circumference of the honeycomb structure; and
a metal pipe for housing the honeycomb structure and the coil wiring.

According to the present invention, it is possible to provide a honeycomb structure and an exhaust gas purifying device, which have an improved combustion efficiency for carbon particulates due to induction heating and have a suppressed increase in pressure loss.

BRIEF DESCRIPTION OF THE DRAWINGS

2(*a*); FIG. 3(*c*) is a partially enlarged view of vicinity of a surface of a partition wall in the cross-sectional view of FIG. 2(*c*);

DETAILED DESCRIPTION OF THE INVENTION

Figure 1:
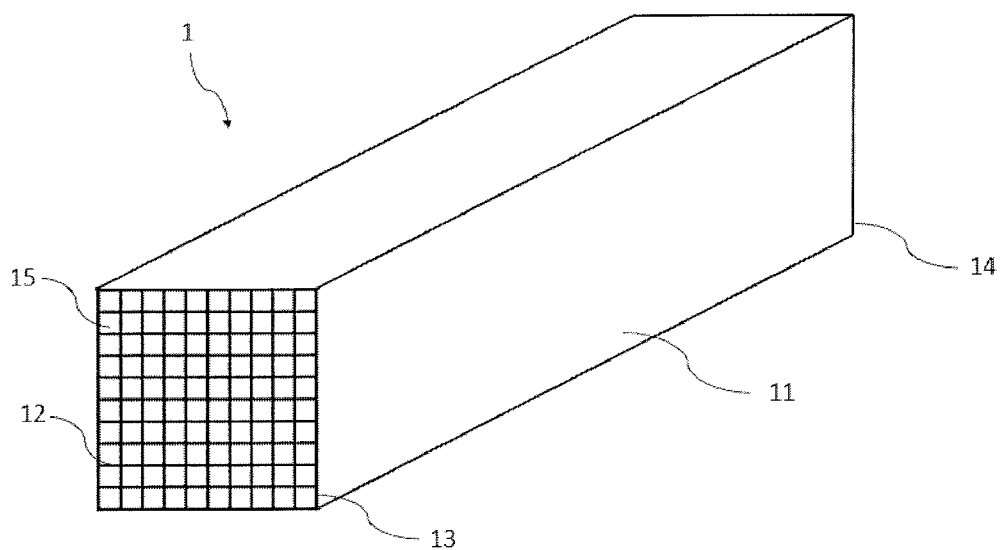
FIG. 1 is a perspective view schematically showing a honeycomb structure according to an embodiment of the present invention.

Hereinafter, embodiments of a honeycomb structure according to the present invention will be described with reference to the drawing. However, the present invention is not limited to these embodiments, and various changes, modifications, and improvements may be made based on knowledge of those skilled in the art, without departing from the scope of the present invention.

<Honeycomb Structure>

FIG. 1 is a perspective view schematically showing a honeycomb structure 1 according to an embodiment of the present invention. The illustrated honeycomb structure 1 is pillar-shaped and has an outer peripheral wall 11 located on the outermost circumference. Further, the illustrated honeycomb structure 1 has the porous partition walls 12 which are arranged inside the outer peripheral wall 11 and define a plurality of cells 15 that penetrate from one end face 13 to the other end face 14 to form flow paths.

Although materials of the partition walls 12 and the outer peripheral wall 11 of the honeycomb structure 1 are not particularly limited, a porous body having a large number of pores are required. Therefore, the partition walls 12 and the outer peripheral wall 11 are generally made of a ceramic material. The ceramic material may be a compound containing at least one, two or more elements selected from Si, Al, and Mg. Examples of the ceramic material includes $SiO_2$, $Al_2O_3$, MgO, cordierite ($2MgO \cdot 2SiO_2 \cdot 5SiO_2$), silicon carbide (SiC), aluminum titanate ($Al_2O_3 \cdot TiO_2$), silicon nitride ($Si_3N_4$), mullite ($3Al_2O_3 \cdot 2SiO_2$), alumina ($Al_2O_3$), a silicon-silicon carbide-based composite material, and silicon carbide-cordierite based composite material. In particular, a sintered body mainly based on cordierite (50% by mass of more of cordierite) is preferable. As used herein, the expression "silicon carbide-based" means that the honeycomb structure 1 contains silicon carbide in an amount of 50% by mass or more of the entire honeycomb structure 1. The phrase "the honeycomb structure 1 is mainly based on a silicon-silicon carbide composite material" means that the honeycomb structure 1 contains 90% by mass or more of the silicon-silicon carbide composite material (total mass) based on the entire honeycomb structure 1. Here, for the silicon-silicon carbide composite material, it contains silicon carbide particles as an aggregate and silicon as a binding material for binding the silicon carbide particles, and a plurality of silicon carbide particles are preferably bonded by silicon so as to form pores between the silicon carbide particles. The phrase "the honeycomb structure 1 is mainly based on silicon carbide" means that the honeycomb structure 1 contains 90% by mass or more of silicon carbide (total mass) based on the entire honeycomb structure 1.

The cell shape of the honeycomb structure 1 may be, but not particularly limited to, a polygonal shape such as a triangle, a quadrangle, a pentagon, a hexagon and an octagon; a circular shape; or an ellipse shape, in a cross section orthogonal to the central axis. Alternatively, the cell shape may be other infinite shapes.

Further, an outer shape of the honeycomb structure 1 may be, but not particularly limited to, a shape such as a pillar shape with circular end faces (circular pillar shape), a pillar shape with oval end faces, and a pillar shape with polygonal (square, pentagonal, hexagonal, heptagonal, octagonal, and the like) end faces, and the like. Furthermore, the size of the honeycomb structure 1 is not particularly limited, and an axial length of the honeycomb structure 1 is preferably from 40 to 500 mm. Further, for example, when the outer shape of the honeycomb structure 1 is cylindrical, a diameter of each end face is preferably from 50 to 500 mm.

Each partition wall of the honeycomb structure 1 preferably has a thickness of from 0.10 to 0.50 mm, and more preferably from 0.25 to 0.45 mm, in terms of ease of production. For example, the thickness of 0.20 mm or more improves the strength of the honeycomb structure 1. The thickness of 0.50 mm or less can result in lower pressure loss when the honeycomb structure 1 is used as a filter. It should be noted that each of the thicknesses of the partition walls 12, collecting layers 23 and heat insulating layers 24 is an average value measured by a method for observing the axial cross section of the honeycomb structure 1 with a microscope.

Further, the partition walls 12 forming the honeycomb structure 1 preferably have a porosity of from 30 to 70%, and more preferably from 40 to 65%, in terms of ease of production. The porosity of 30% or more tends to decrease a pressure loss. The porosity of 70% or less can maintain the strength of the honeycomb structure 1. Here, the porosity of each of the partition walls 12, the collecting layers 23 and the heat insulating layers 24 as described later can be measured by the following method. First, a honeycomb structure in which partition walls, collecting layers or heat insulating layers are arranged on surfaces of partition wall base materials is embedded in a resin. The honeycomb structure embedded in the resin is then cut perpendicularly to a cell extending direction. The cut surface of the cut honeycomb structure is polished, and the collecting layers in the cut surface are observed with a scanning electron microscope (SEM). Using the observed SEM image (magnifications of 5000), a ratio of pores formed in the partition walls, collecting layers or heat insulating layers is measured by image processing software (Image-Pro Plus 7.0 (trade name) from Nippon Visual Science Co., Ltd.). The "ratio of pores" thus measured is the porosity of the partition walls, the collecting layers or the heat insulating layers.

The porous partition walls 12 preferably have an average pore size of from 5 to 30 µm, and more preferably from 10 to 25 µm. The average pore size of 5 µm or more can further decrease the pressure loss when the honeycomb structure 1 is used as a filter. The average pore size of 30 µm or less can maintain the strength of the honeycomb structure 1. As used herein, the terms "average pore diameter" and "porosity"

mean an average pore diameter and a porosity measured by mercury porosimetry, respectively.

The honeycomb structure 1 preferably has a cell density in a range of from 5 to 93 cells/cm$^2$, and more preferably in a range of from 5 to 63 cells/cm$^2$, and even more preferably in a range of from 31 to 54 cells/cm$^2$, although not particularly limited thereto.

Figure 2A:
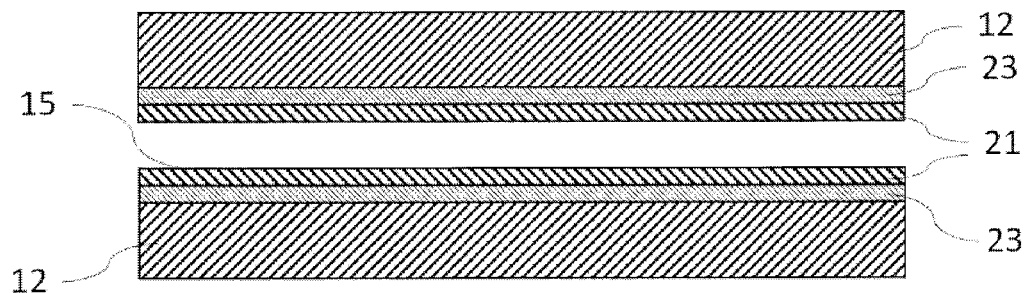
FIG. 2: each of FIGS. 2(a)-(c) is a cross-sectional view schematically showing a cross section of cells and partition walls of a honeycomb structure according to an embodiment of the present invention, the cross section being parallel to an extending direction of the cells.
Figure 2B:
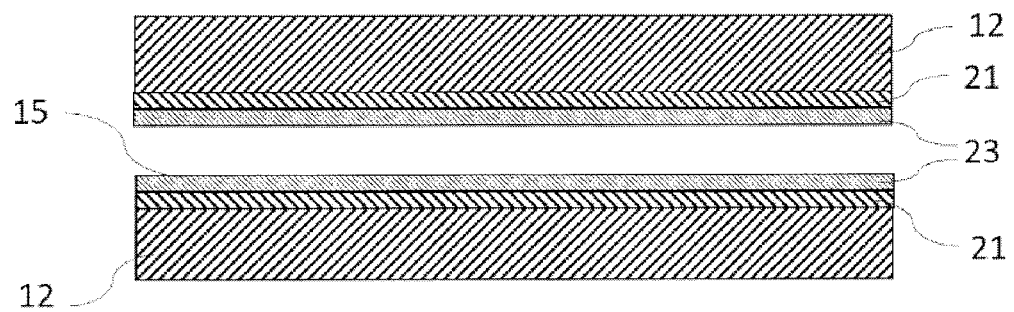
Figure 2C:
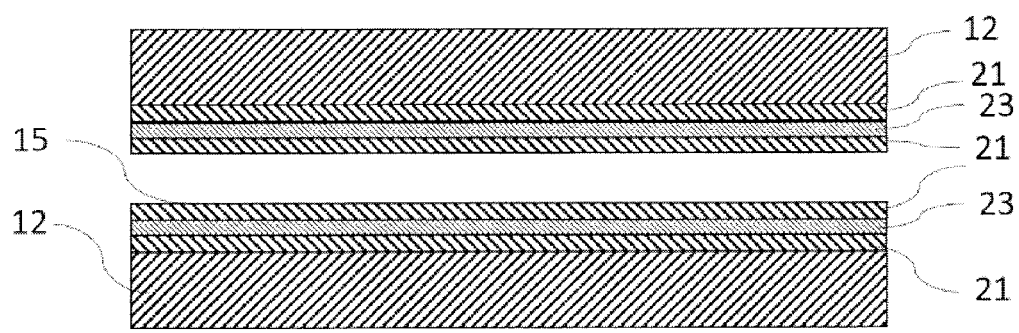

FIGS. 2(a), 2(b), and 2(c) are cross-sectional views schematically showing cross sections of the cells 15 and the partition walls 12 of the honeycomb structures 1, which are parallel to the extending direction of the cells 15, respectively.

The honeycomb structure 1 is provided with collecting layers 23 each having an average pore diameter lower than that of each of the partition walls 12, on the surfaces of the partition walls 12 in the cells 15. Further, magnetic particles 21 having a Curie point of 700° C. or more are provided either or both between the surfaces of the partition wall 12 and the collecting layer 23 of the honeycomb structure 1, and on the collecting layers 23. According to such a configuration, each collecting layer 23 having an average pore diameter lower than that of each partition wall 12 can be provided, thereby preventing carbon particulates and the like contained in an exhaust gas from being penetrated into the honeycomb base material from the surfaces of the partition walls 12 when the honeycomb structure 1 is used as a filter. Therefore, the combustion efficiency of carbon particulates and the like is improved, so that an increase in pressure loss of the filter can be suppressed. Further, since the magnetic particles having a Curie point of 700° C. or higher are provided either or both between the surfaces of the partition wall 12 and the collecting layer 23, and on the collecting layers 23, the induction heating can reach a honeycomb temperature sufficient to increase a catalyst temperature to a higher catalytically active temperature, as well as the honeycomb structure filter can be easily regenerated by burning and removing the carbon particulates and the like collected in the cells 15. Further, since the magnetic particles 21 are provided either or both between the surfaces of the partition wall 12 and the collecting layer 23, and on the collecting layers 23, the carbon particulates collected by the collecting layers 23 can be efficiently burned out by subjecting the magnetic particles 21 near the collecting layers to induction heating. Therefore, the combustion efficiency of carbon particulates and the like can be improved, and the increase in pressure loss of the filter can be more satisfactorily suppressed.

Average pore diameters of the collecting layers 23 and the heat insulating layers 24 can be measured by the mercury intrusion method. According to the measurement method, in the form of a peak value in a mercury porosimeter, a difference between a mercury porosicurve (pore volume frequency) with the collecting layers or heat insulating layers and a mercury porosicurve only for the base material obtained by scraping and removing only the collecting layers or the heat insulating layers is determined to be the porosicurve for the collecting layers or the heat insulating layers, and its peak value is determined to be an average pore diameter. Further, an SEM image of the cross section of the honeycomb structure may be taken, and void portions and solid portions may be binarized by image analysis of portions of the collecting layers or the heat insulating layers, and 20 or more voids may be randomly selected, and an average of their inscribed circles may be determined to be the average pore diameter.

The arrangement of the collecting layers 23 and the magnetic particles 21 is not particularly limited as long as the magnetic particles 21 are provided either or both between the surfaces of the partition wall 12 and the collecting layer 23, and on the collecting layers 23. For example, as shown in FIG. 2(a), the collecting layers 23 may be provided on the surfaces of the partition walls 12 in the cells 15, and the magnetic particles 21 may be provided on the surfaces of the collecting layers 23 (on the flow path side of the cell 15). Further, as shown in FIG. 2(b), the magnetic particles 21 may be provided on the surfaces of the partition walls 12 in the cells 15, and the collecting layers 23 may be provided on the surfaces of the magnetic particles 21 (on the flow path side of the cells 15). Furthermore, as shown in FIG. 2(c), the magnetic particles 21 may be provided on the surfaces of the partition walls 12 in the cells 15, and the collecting layers 23 may be provided on the surfaces of the magnetic particles 21 (on the flow path side of the cell 15), and the magnetic particles 21 may be further provided on the surfaces of the collecting layers 23 (on the flow path side of the cell 15). In the configuration of FIG. 2(c), the magnetic particles 21 are provided on both sides of each collecting layer 23 (the partition wall 12 side and the flow path side of the cell 15), so that the combustion efficiency of the carbon particulates and the like collected by the collecting layers 23 can be more improved than the configurations of FIGS. 2(a) and 2(b). In the configurations of FIGS. 2(a) and 2(b), the cross-sectional areas of the flow paths of the cells 15 are wider and the pressure loss of the filter is smaller than those of the configuration of FIG. 2(c).

Figure 3A:
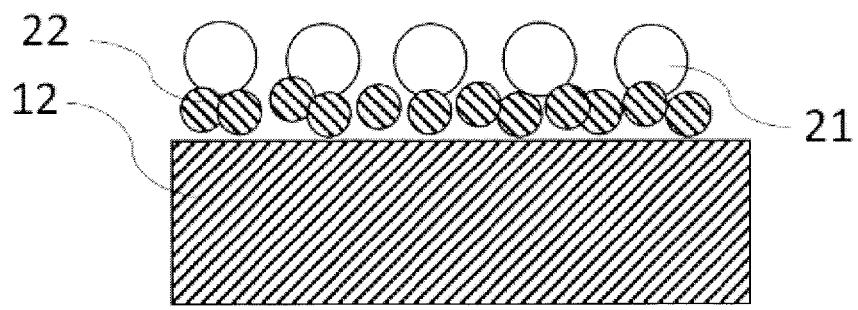
FIG. 3(a) is a partially enlarged view of vicinity of a surface of a partition wall in the cross-sectional view of FIG.
Figure 3B:
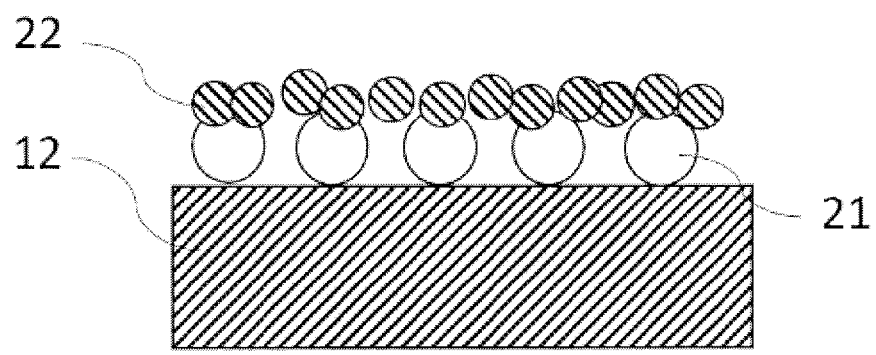
FIG. 3(*b*) is a partially enlarged view of vicinity of a surface of a partition wall in the cross-sectional view of FIG. 2(*b*)
Figure 3C:
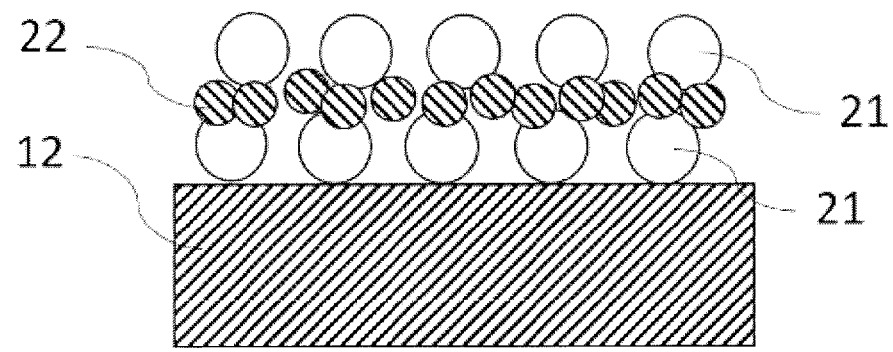

It should be noted that although the magnetic particles 21 are shown in the form of layers for convenience in FIGS. 2(a), 2(b) and 2(c), they are actually in the form of particles as shown in FIGS. 3(a), 3(b) and 3(c). Further, as shown in FIGS. 3(a), 3(b) and 3(c), each collecting layer 23 is composed of a group of particles 22. The particles 22 forming each collecting layer 23 may be separated from each other, or may be in contact with each other, or may be sintered in contact with each other. FIGS. 3(a), 3(b) and 3(c) are partially enlarged views near the surfaces of the partition walls 12 in cross-sectional views of FIGS. 2(a), 2(b) and 2(c), respectively.

Each collecting layer 23 preferably has an average pore diameter of 1 to 10 μm, and more preferably 1 to 8 μm, and even more preferably 1 to 5 μm. The average pore diameter of each collecting layer 23 of 1 μm or more can lead to a further reduced pressure loss when the honeycomb structure 1 is used as a filter. The average pore diameter of each collecting layer 23 of 10 μm or less can satisfactorily prevent the carbon particulates and the like contained in the exhaust gas from passing through the pores of the partition walls 12 to leak out from the honeycomb structure 1. Each collecting layer 23 may be made of a compound containing an oxide of at least one or two or more elements selected from the group comprising Si, Al, Mg, or Ti. Each collecting layer 23 may include at least one, two or more selected from the group comprising $SiO_2$, $Al_2O_3$, MgO, $TiO_2$, cordierite ($2MgO·2SiO_2·5SiO_2$), aluminum titanate ($Al_2O_3·TiO_2$), or magnesium titanate ($MgO·TiO_2$).

Each collecting layer 23 preferably has a porosity of 40 to 80%, and more preferably 50 to 80%, and even more preferably 60 to 80%. The porosity of each collecting layer 23 of 40% or more can lead to a further reduced pressure loss when the honeycomb structure 1 is used as a filter. The porosity of each collecting layer 23 of 80% or less can satisfactorily prevent the carbon particulates and the like contained in the exhaust gas from passing through the pores of the partition walls 12 to leak out from the honeycomb structure 1.

Each collecting layer 23 preferably has a thickness of 10 to 80 μm, and more preferably 10 to 50 μm, and even more preferably 10 to 30 μm. The thickness of each collecting layer of 10 μm or more can prevent the carbon particulates and the like contained in the exhaust gas from passing through the pores of the partition walls 12 to leak out from the honeycomb structure 1 when the honeycomb structure 1 is used as a filter. The thickness of each collecting layer 23 of 80 μm or less can lead to a further reduced pressure loss when the honeycomb structure 1 is used as a filter.

Each collecting layer 23 preferably has a thermal conductivity lower than that of the porous partition wall 12. Such a configuration can prevent the heat from the induction-heated magnetic particles 21 being released into the partition walls 12, leading to a further improved combustion efficiency of the carbon particulates collected by the collecting layers 23. The thermal conductivity of each collecting layer 23 is preferably 2 W/mK or less, and more preferably 1 W/mK or less, and even more preferably 0.5 W/mK or less, and typically from 0.1 to 1 W/mK. Further, when each collecting layer 23 does not have a heat insulating layer 24 as described later and each collecting layer 23 has a heat insulating function, the thermal conductivity may typically be from 0.01 to 1 W/mK.

The thermal conductivities of the collecting layers 23, the porous partition walls 12, and the heat insulating layers 24 as described later can be measured as follows: measuring densities of the materials themselves forming the collecting layers 23, the porous partition walls 12 and the heat insulating layers 24 by a mercury porosimeter, measuring each specific heat by a DSC (Differential Scanning calorimetry) method, and measuring each thermal diffusivity by a laser flash method; and subsequently calculating each thermal conductivity of the materials from a relational expression of thermal diffusivity×specific heat×density=thermal conductivity.

The magnetic particles 21 have a curie temperature of 700° C. or higher as described above. The magnetic particles having a curie temperature of 700° C. or higher may be composed of a material containing at least one element selected from the group comprising Fe, Co, or Ni. Examples of the material include balance Co-20% by mass Fe; balance Co-25% by mass Ni-4% by mass Fe; balance Fe-15-35% by mass Co; balance Fe-17% by mass Co-2% by mass Cr-1% by mass Mo; balance Fe-49% by mass Co-2% by mass V; balance Fe-18% by mass Co-10% by mass Cr-2% by mass Mo-1% by mass Al; balance Fe-27% by mass Co-1% by mass Nb; balance Fe-20% by mass Co-1% by mass Cr-2% by mass V; balance Fe-35% by mass Co-1% by mass Cr; balance Fe-17% by mass Cr; pure cobalt; pure iron; electromagnetic soft iron; balance Fe-0.1-0.5% by mass Mn; balance Fe-30% by mass Si; and the like. As used herein, the Curie point of the magnetic particles 21 refers to a temperature at which a ferromagnetic property is lost.

The magnetic particles 21 preferably have a volume-based average particle diameter D50 of 10 to 3000 μm. The volume-based average particle size D50 of the magnetic particles 21 of 10 μm or more can lead to an improved heating efficiency. The volume-based average particle diameter D50 of the magnetic particles 21 of 3000 μm or less can allow the magnetic particles to be easily supported on the honeycomb. The volume-based average particle diameter D50 of the magnetic particles 21 is more preferably 10 to 1000 μm, and even more preferably 10 to 300 μm.

A volume ratio of the magnetic particles 21 is preferably 1 to 30% to the total volume of the outer peripheral wall 11 and the partition walls 12 of the honeycomb structure 1. The volume ratio of the magnetic particles 21 of 1% or more to the total volume of the outer peripheral wall 11 and the partition walls 12 of the honeycomb structure 1 can allow the honeycomb structure 1 to be efficiently heated. The volume ratio of the magnetic particles 21 of 30% or less to the total volume of the outer peripheral wall 11 and the partition walls 12 of the honeycomb structure 1 can allow a larger amount of carbon particulates and the like to be collected, and the pressure loss to be further reduced when the honeycomb structure 1 is used as a filter. The volume ratio of the magnetic particles 21 can be controlled by managing the total mass of the magnetic particles 21 used when producing the honeycomb structure 1 and the total mass of the outer peripheral wall 11 and the partition walls 12. The volume ratio of the magnetic particles 21 can be calculated from densities and the masses described above from previously measured densities of the raw material of the magnetic particles 21 and the raw materials of the outer peripheral wall 11 and the partition walls 12 used when producing the honeycomb structure 1 by means of a pycnometer or the like. Further, the measurement may be carried out by subjecting the honeycomb structure 1 to image analysis, and taking a ratio of the total area or the total volume of the magnetic particles 21 to the total area or the total volume of the outer peripheral wall 11 and the partition walls 12.

Surfaces of the magnetic particles 21 are preferably coated with protective layers. Such a configuration can allow the magnetic particles 21 to be protected by the protective layers, thereby satisfactorily suppressing an increase in resistance due to deterioration of the magnetic particles 21. Each protective layer has a function of protecting the deterioration of the magnetic particles 21, and has, for example, an antioxidant function of the magnetic particles 21.

Examples of materials of the protective layers 23 that can used includes ceramics, glass, or a composite material of ceramics and glass. Examples of a composite material include a material containing 50% by volume or more, more preferably 60% by volume or more, and still more preferably 70% by volume or more of glass. Examples of the ceramics forming the protective layers include ceramics such as $SiO_2$-, $Al_2O_3$-, $SiO_2$—$Al_2O_3$-, $SiO_2$—$ZrO_2$-, and $SiO_2$—$Al_2O_3$—$ZrO_2$-based ceramics. Examples of the glass forming the protective layers include glass such as lead-free $B_2O_3$—$Bi_2O_3$-, $B_2O_3$—$ZnO$—$Bi_2O_3$-, $B_2O_3$—$ZnO$-, $V_2O_5$—$P_2O_5$-, $SnO$—$P_2O_5$-, $SnO$—$ZnO$—$P_2O_5$-, $SiO_2$—$B_2O_3$—$Bi_2O_3$-, $SiO_2$—$Bi_2O_3$—$Na_2O$-, and $SiO_2$—$Al_2O_3$—$MgO$-based glass.

Figure 4:
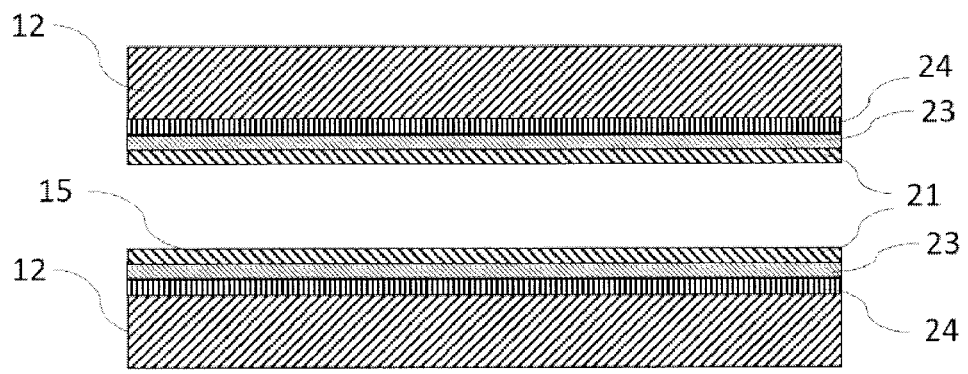
FIG. 4 is a cross-sectional view schematically showing a cross section of cells and partition walls of a honeycomb structure having heat insulating layers according to an embodiment of the present invention, the cross section being parallel to an extending direction of the cells.

FIG. 4 is a cross-sectional view schematically showing a cross section of the cells 15 and the partition walls 12 of the honeycomb structure 1 having the heat insulating layers 24 according to the embodiment of the present invention, which cross sections are parallel to the extending direction of the cell 15. In FIG. 4, when the collecting layers 23 and the magnetic particles 21 are in the form as shown in FIG. 2(a), each of the heat insulating layers 24 may be further provided between the surface of each of the partition walls 12 and each of the collecting layers 23. Further, when the collecting layers 23 and the magnetic particles 21 are in the form as shown in FIG. 2(b), each of the heat insulating layers 24 may be further provided between the surface of each of the partition walls 12 and each of the magnetic particles 21. Furthermore, when the collecting layers 23 and the magnetic particles 21 are in the form as shown in FIG. 2(c), each of the heat insulating layers 24 may be further provided between the surface of each of the partition walls 12 and each of the magnetic particles 21. In these configurations, the thermal conductivity of the heat insulating layers 24 is made lower than that of the collecting layer 23, or the thermal conductivity of the heat insulating layers 24 is made lower than that of the partition walls 12, whereby the heat from the magnetic particles 21 subjected to induction heating can be prevented from being released into the partition walls 12, resulting in an improved combustion efficiency of the carbon particulates collected by the collection layers 23. The thermal conductivity of the heat insulating layers 24 is preferably 2 W/mK or less, and more preferably 1 W/mK or less, and even more preferably 0.5 W/mK or less, and typically from 0.01 to 1.

It is preferable that the porosity of each heat insulating layer 24 is higher than that of each collecting layer 23 and is from 60 to 98%. Since the porosity of each heat insulating layer 24 is higher than that of each collecting layer 23, the heat from the magnetic particles 21 subjected to induction heating can be prevented from being released into the partition walls 12, resulting in an improved combustion efficiency of the carbon particulates and the like collected by the collecting layers 23. The porosity of each heat insulating layer 24 of 60% or more can lead to improved gas permeability and decreased pressure loss. The porosity of each heat insulating layer 24 of 98% or less can prevent the heat from the magnetic particles 21 subjected to conduction heating from being released into the partition walls 12, resulting in a further improved combustion efficiency of the carbon particulates and the like collected by the collecting layers 23. The porosity of each heat insulating layer 24 is preferably 60 to 98%, and more preferably 65 to 98%.

It is preferable that the average pore diameter of each heat insulating layer 24 is lower than that of each partition wall 12 and is 0.005 to 1 µm. Since the average pore diameter of each heat insulating layer 24 is lower than that of each partition wall 12 can prevent the heat from the magnetic particles 21 subjected to induction heating from being released into the partition walls 12, resulting in a further improved combustion efficiency of the carbon particulates collected by the collecting layers 23. The average pore diameter of each heat insulating layer 24 of 0.005 µm or more can lead to improved gas permeability and decreased pressure loss. The average pore diameter of each heat insulating layer 24 of 1 µm or less can prevent the heat from the magnetic particles 21 subjected to induction heating from being released into the partition walls 12, resulting in a further improved combustion efficiency of carbon particulates and the like collected by the collecting layers 23. The average pore diameter of each heat insulating layer 24 is more preferably 0.005 to 1 µm, and even more preferably 0.005 to 0.5 µm.

Examples of the material of each heat insulating layer 24 include $ZrO_2$, $SiO_2$, $TiO_2$, and glass.

Such a honeycomb structure 1 is produced by forming a green body containing a ceramic raw material into a honeycomb shape having partition walls 12 that penetrate from one end face to other end face and define a plurality of cells 15 to form flow paths for a fluid, to form a honeycomb formed body, and drying the honeycomb formed body and then firing it. When such a honeycomb structure is used as the honeycomb structure 1 according to the present embodiment, the outer peripheral wall may be integrally extruded with a honeycomb structure portion, which is used as the outer peripheral wall as it is, or an outer circumference of the honeycomb formed body (honeycomb structure) may be ground and shaped into a predetermined shape after forming or firing it, and a coating material may be applied to the outer circumference-ground honeycomb structure to form an outer peripheral coating. In the honeycomb structure 1 of this embodiment, for example, a honeycomb structure having an outer circumference without grinding the outermost circumference of the honeycomb structure may be used, and the coating material may be further applied onto the outer peripheral surface of the honeycomb structure having the outer circumference (that is, a further outer side of the outer circumference of the honeycomb structure) to form the outer coating. That is, in the former case, only the outer peripheral coating made of the coating material forms the outer peripheral surface positioned on the outermost circumference. On the other hand, in the latter case, an outer peripheral wall having a two-layered structure positioned on the outermost periphery is formed in which the outer peripheral coating made of the coating material is further laminated on the outer peripheral surface of the honeycomb structure. The outer peripheral wall may be extruded integrally with the honeycomb structure portion and fired as it is, which may be used as the outer peripheral wall without processing the outer circumference.

A composition of the coating material is not particularly limited, and various known coating materials can be appropriately used. The coating material may further contain colloidal silica, an organic binder, clay and the like. The organic binder is preferably used in an amount of from 0.05 to 0.5% by mass, and more preferably from 0.1 to 0.2% by mass. Further, the clay is preferably used in an amount of from 0.2 to 2.0% by mass, and more preferably from 0.4 to 0.8% by mass.

The honeycomb structure 1 is not limited to an integral type honeycomb structure 1 in which the partition walls 12 are integrally formed. For example, the honeycomb structure 1 may be a honeycomb structure 1 in which pillar shaped honeycomb segments each having a plurality of cells 15 defined by porous partition walls 12 to form flow paths for a fluid are combined via joining material layers (which, hereinafter, may be referred to as a "joined honeycomb structure").

The honeycomb structure 1 according to the present embodiment may have a catalyst supported on the surfaces of the porous partition walls 12 that form inner walls of the cells 15 and/or in pores of the partition walls 12. Thus, the honeycomb structure 1 according to the present embodiment may be structured as a catalyst support having a supported catalyst.

A type of the catalyst is not particularly limited, and it can be appropriately selected according to the use purposes and applications of the honeycomb structure 1. Examples of the catalyst include noble metal catalysts or other catalysts. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst (LNT catalyst) containing an alkaline earth metal and platinum as storage components for nitrogen oxides ($NO_x$). Illustrative examples of a catalyst that does not use the noble metal include a $NO_x$ selective catalytic reduction catalyst (SCR catalyst) containing a copper-substituted or iron-substituted zeolite, and the like. Also, two or more catalysts selected from the group comprising those catalysts may be used. A method for supporting the catalyst is not particularly limited, and it can be carried out according to a conventional method for supporting the catalyst on the honeycomb structure.

Using each of fired honeycomb structures as a honeycomb segment, the side faces of the plurality of honeycomb segments can be joined with a joining material so as to be integrated to provide a honeycomb structure in which the honeycomb segments are joined. For example, the honeycomb structure in which the honeycomb segments are joined can be produced as follows. The joining material is applied to joining surfaces (side surfaces) of each honeycomb segment while attaching joining material adhesion preventing masks to both end faces of each honeycomb segment.

These honeycomb segments are then arranged adjacent to each other such that the side surfaces of the honeycomb segments are opposed to each other, and the adjacent honeycomb segments are pressure-bonded together, and then heated and dried. Thus, the honeycomb structure in which the side surfaces of the adjacent honeycomb segments are joined with the joining material is produced. For the honeycomb structure, the outer peripheral portion may be ground into a desired shape (for example, a pillar shape), and the coating material may be applied to the outer peripheral surface, and then heated and dried to form an outer peripheral wall 11.

The material of the joining material adhesion preventing mask that can be suitably used includes, but not particularly limited to, synthetic resins such as polypropylene (PP), polyethylene terephthalate (PET), polyimide, Teflon (registered trademark) and the like. Further, the mask is preferably provided with an adhesive layer, and the material of the adhesive layer is preferably an acrylic resin, a rubber (for example, a rubber mainly based on a natural rubber or a synthetic rubber), or a silicon resin.

Examples of the joining material adhesion preventing mask that can be suitably used include a pressure sensitive adhesive film having a thickness of from 20 to 50 μm.

The joining material that can be used may be prepared by, for example, mixing ceramic powder, a dispersion medium (for example, water or the like), and optionally additives such as a binder, a deflocculant and a foaming resin. The ceramics may be preferably ceramics containing at least one selected from the group comprising cordierite, mullite, zircon, aluminum titanate, silicon carbide, silicon nitride, zirconia, spinel, indialite, sapphirine, corundum, or titania, and more preferably having the same material as that of the honeycomb structure. The binder includes polyvinyl alcohol, methyl cellulose, CMC (carboxymethyl cellulose) and the like.

Next, a method for producing the honeycomb structure 1 will be described. First, the honeycomb structure having the porous partition walls and the plurality of cells defined by the partition walls is produced. For example, when producing the honeycomb structure made of cordierite, a cordierite-forming raw material is firstly prepared. The cordierite-forming raw material contains a silica source component, a magnesia source component, and an alumina source component, and the like, in order to formulate each component so as to have a theoretical composition of cordierite. Among them, the silica source component that can be used includes preferably quartz and fused silica, and the particle diameter of the silica source component is preferably from 100 to 150 μm.

Examples of the magnesia source component include talc and magnesite. Among them, talc is preferred. The talc is preferably contained in an amount of from 37 to 43% by mass in the cordierite-forming raw material. The talc preferably has a particle diameter (average particle diameter) of from 5 to 50 μm, and more preferably from 10 to 40 μm.

Further, the magnesia (MgO) source component may contain $Fe_2O_3$, CaO, $Na_2O$, $K_2O$ and the like as impurities.

The alumina source component preferably contains at least one of aluminum oxide and aluminum hydroxide, in terms of fewer impurities. Further, aluminum hydroxide is preferably contained in an amount of from 10 to 30% by mass, and aluminum oxide is preferably contained in an amount of from 0 to 20% by mass, in the cordierite-forming raw material.

A material for a green body to be added to the cordierite-forming raw material (additive) is then prepared. At least a binder and a pore former are used as additives. In addition to the binder and the pore former, a dispersant or a surfactant can be used.

The pore former that can be used includes a substance that can be oxidatively removed by reacting with oxygen at a temperature equal to or lower than a firing temperature of cordierite, or a low melting point reactant having a melting point at a temperature equal to or lower than the firing temperature of cordierite, or the like. Examples of the substance that can be oxidatively removed include resins (particularly particulate resins), graphite (particularly particulate graphite) and the like. Examples of the low melting point reactant that can be used include at least one metal selected from the group comprising iron, copper, zinc, lead, aluminum, or nickel, alloys mainly based on those metals (e.g., carbon steel or cast iron for iron, stainless steel), or alloys mainly based on two or more of those metals. Among them, the low melting point reactant is preferably an iron alloy in the form of powder or fiber. Further, the low melting point reactant preferably has a particle diameter or a fiber diameter (an average diameter) of from 10 to 200 μm. Examples of a shape of the low melting point reactant include a spherical shape, a wound-lozenge shape, a konpeito shape, and the like. These shapes are preferable because the shape of the pores can be easily controlled.

Examples of the binder include hydroxypropylmethyl cellulose, methyl cellulose, hydroxyethyl cellulose, carboxymethyl cellulose, polyvinyl alcohol and the like. Further, examples of the dispersant include dextrin, polyalcohol and the like. Furthermore, examples of the surfactant include fatty acid soaps. The additive may be used alone or in combination of two or more.

Subsequently, to 100 parts by mass of the cordierite-forming raw material are added from 3 to 8 parts by mass of the binder, from 3 to 40 parts by mass of the pore former, from 0.1 to 2 parts by mass of the dispersant, and from 10 to 40 parts by mass of water, and these materials for a green body are kneaded to prepare a green body.

The prepared green body is then formed into a honeycomb shape by an extrusion molding method, an injection molding method, a press molding method, or the like to obtain a raw honeycomb formed body. The extrusion molding method is preferably employed, because continuous molding is easy, and, for example, cordierite crystals can be oriented. The extrusion molding method can be performed using an apparatus such as a vacuum green body kneader, a ram type extrusion molding machine, a twin-screw type continuous extrusion molding machine, or the like.

The honeycomb formed body is then dried and adjusted to a predetermined size to obtain a honeycomb dried body. The honeycomb formed body can be dried by hot air drying, microwave drying, dielectric drying, drying under reduced pressure, vacuum drying, freeze drying and the like. It is preferable to perform combined drying of the hot air drying and the microwave drying or dielectric drying, because the entire honeycomb formed body can be rapidly and uniformly dried.

Further, a raw material for forming the collecting layers, a raw material for forming the magnetic particles, and optionally a raw material for forming heat insulating layers are separately prepared. The raw material for forming the collecting layers that can be used herein includes a material containing at least one selected from the group comprising $SiO_2$, $Al_2O_3$, MgO, or $TiO_2$. The raw material for forming the magnetic particles that can be used herein includes particles containing at least one element selected from the group comprising Fe, Co, or Ni. The raw material for forming the heat insulating layers that can be used herein includes $ZrO_2$, $SiO_2$, $TiO_2$ particles; alkoxides or gels of these metals; glass and the like.

Subsequently, if necessary, the raw material for the heat insulating layers is firstly applied to the surfaces of the partition walls in the cells of the dried honeycomb body. The raw materials for the collecting layers and the raw material for the magnetic particles are then applied to the surfaces of the partition walls in the cells or the surface of the raw material for forming the heat insulating layers in a desirable order.

Figure 5:
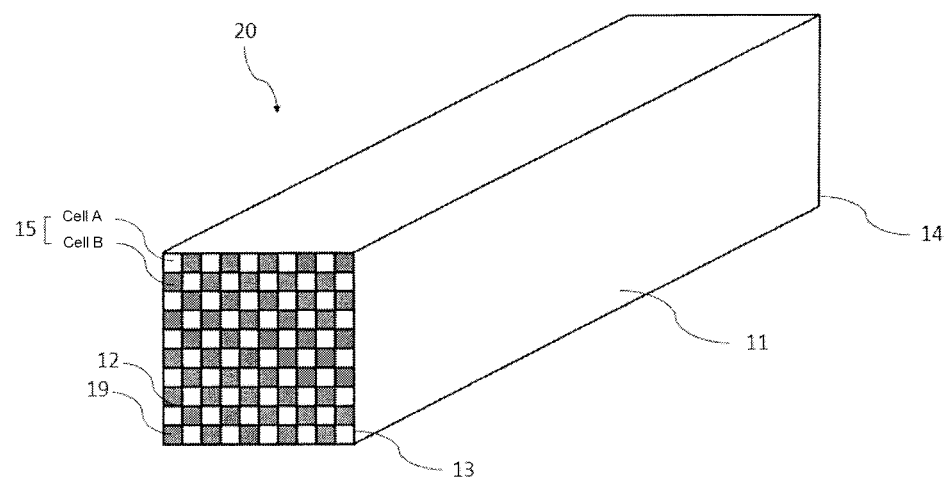
FIG. 5 is a perspective view schematically showing a honeycomb structure having plugged portions according to an embodiment of the present invention.
Figure 6:
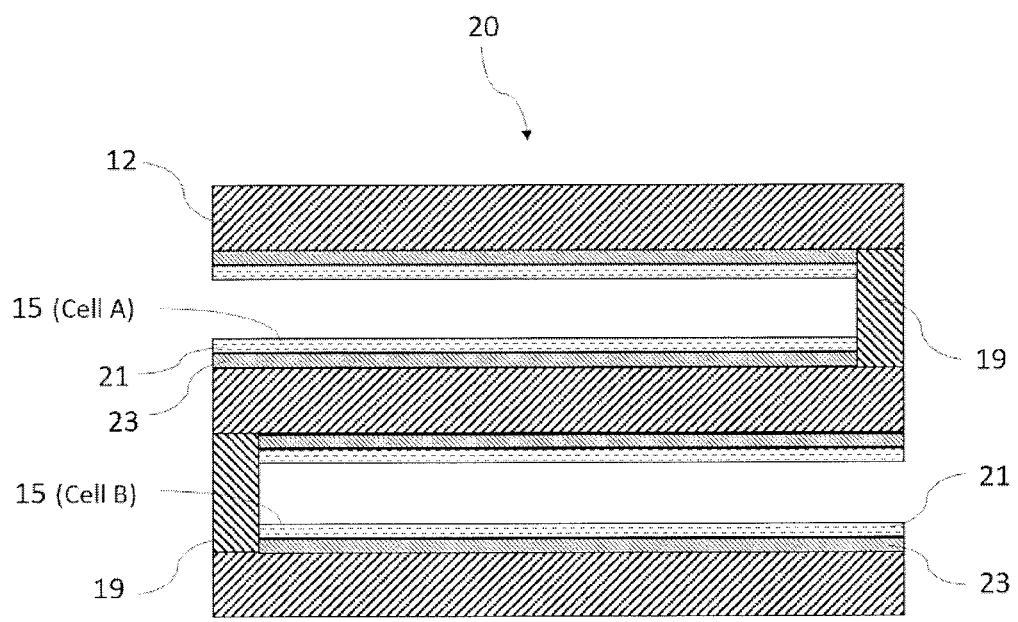
FIG. 6 is a cross-sectional view schematically showing a cross section of cells and partition walls of a honeycomb structure having plugged portions according to an embodiment of the present invention, the cross section being parallel to an extending direction of the cells.

In addition, when producing the honeycomb structure 20 having the plugged portions as shown in FIGS. 5 and 6, a raw material for the plugged portions is prepared herein. The material for the plugged portions (plugging slurry) may use the same material for a green body as that of the partition walls (honeycomb dried body), or may use a different material. Specifically, the raw material for the plugged portions can be obtained by mixing a ceramic raw material, a surfactant, and water, and optionally adding a sintering aid, a pore former and the like to form a slurry, which is kneaded using a mixer or the like. Subsequently, masks are applied onto some of cell opening portions on one end face of the honeycomb dried body, and the end face is immersed in a storage container in which the plugging slurry is stored to fill the non-masked cells with the plugging slurry. Similarly, masks are applied onto some of cell opening portions on the other end face of the honeycomb dried body, and the end face is immersed in a storage container in which the plugging slurry is stored to fill the non-masked cells with the plugging slurry. It is then dried to obtain a honeycomb dried body having plugged portions. A method of plugging is simply carried out by pushing a paste-like material into the cells with a spatula such as a squeegee. It is easy to control the depth by the number of squeegee processes pushed. The number of pushing processes is increased for the portions of the cells desired to insert the magnetic material deeply, and the number of pushing processes is decreased for shallow portions around the former cells.

The honeycomb dried body is then fired to obtain a honeycomb structure. As the drying conditions, the same conditions as those for drying the honeycomb formed body can be used. Further, the conditions for the above firing can be typically in an air atmosphere at a temperature of 1410 to 1440° C. for 3 to 15 hours, when the cordierite-forming raw material is used.

When the honeycomb structure thus obtained is produced in a state where the outer peripheral wall is formed on the outer peripheral surface of the honeycomb structure, the outer peripheral surface may be ground to remove the outer peripheral wall. The coating material is applied to the outer circumference of the honeycomb structure from which the outer peripheral wall has thus been removed, in a subsequent step, to form an outer peripheral coating. Further, when grinding the outer peripheral surface, a part of the outer peripheral wall may be ground and removed, and on that part, the outer peripheral coating may be formed by the coating material.

When preparing the coating material, it can be prepared using, for example, a biaxial rotary type vertical mixer.

Further, the coating material may further contain colloidal silica, an organic binder, clay and the like. The content of the organic binder is preferably from 0.05 to 0.5% by mass, and more preferably from 0.1 to 0.2% by mass. The content of the clay is preferably from 0.2 to 2.0% by mass, and more preferably from 0.4 to 0.8% by mass.

The coating material is applied onto the outer peripheral surface of the honeycomb structure previously produced, and the applied coating material is dried to form an outer peripheral coating. Such a structure can allow for effective suppression of cracking in the outer peripheral coating during the drying and the heat treatment.

Examples of a method for coating the coating material can include a method for applying the coating material by placing the honeycomb structure on a rotating table and rotating it, and pressing a blade-shaped applying nozzle along the outer peripheral portion of the honeycomb structure while discharging the coating material from the applying nozzle. Such a configuration can allow the coating material to be applied with a uniform thickness. Further, this method can lead to a decreased surface roughness of the formed outer peripheral coating, and can result in an outer peripheral coating that has an improved appearance and is difficult to be broken by thermal shock.

When the outer peripheral surface of the honeycomb structure is ground and the outer peripheral wall is removed, the coating material is applied onto the entire outer peripheral surface of the honeycomb structure to form the outer peripheral coating. On the other hand, when the outer peripheral wall is present on the outer peripheral surface of the honeycomb structure or a part of the outer peripheral wall is removed, the coating material may be partially applied to form the outer peripheral coating, or the coating material may be, of course, applied onto the entire outer peripheral surface of the honeycomb structure to form the outer peripheral coating.

The method for drying the applied coating material (i.e., the undried outer peripheral coating) is not limited, but in terms of preventing dry-cracking, it can suitably use, for example, a method of drying 25% or more of a water content in the coating material by maintaining the coating material at room temperature for 24 hours or more, and then maintaining it in an electric furnace at 600° C. for 1 hour or more to remove moisture and organic matters.

Further, when the opening portions of the cells of the honeycomb structure are not plugged in advance, plugging may be performed in the opening portions of the cells after forming the outer peripheral coating.

FIG. 5 shows a perspective view schematically showing a honeycomb structure 20 having plugged portions 19 according to an embodiment of the present invention. FIG. 6 shows a cross-sectional view schematically showing a cross section of cells 15 and partition walls 12 of the honeycomb structure 20 having plugged portions 19 according to an embodiment of the present invention, the cross section being parallel to an extending direction of the cells 15. The honeycomb structure 20 is formed in a pillar shape, and includes: an outer peripheral wall 11; and porous partition walls 12 arranged on an inner side of the outer peripheral wall 11, the porous partition walls 12 defining a plurality of cells 15 extending from one end face 13 to other end face 14 to form flow paths for a fluid. In the illustrated honeycomb structure 20, the cells 15 include: a plurality of cells A which are opened on the one end face 13 side and have plugged portions 19 on the other end face 14; and a plurality of cells B which are arranged alternately with the cells A, and which are opened on the other end face 14 side and have plugged portions 19 on the one end face 13. The cells A and the cells B are alternately arranged so as to be adjacent to each other via the partition walls 12, and both end faces form a checkered pattern. The numbers, arrangements, shapes and the like of the cells A and B, as well as the thickness of the partition walls 12, and the like, are not limited, and may be appropriately designed as needed. The honeycomb structure 20 having such a configuration can be used as a filter (for example, a diesel particulate filter; hereinafter, also referred to as "DPF") provided with the plugged portions 19 for burning and removing particulate matters (carbon particulates) in an exhaust gas by using induction heating. In addition, the plugged portions 19 may employ those formed in the same manner as in the plugged portions of the conventionally known honeycomb structure. The plugged portions 19 may be arranged after forming an outer peripheral coating, or may be arranged before forming the outer peripheral coating, i.e., at the stage of production of the honeycomb structure 20.

<2. Exhaust Gas Purifying Device>

Figure 7:
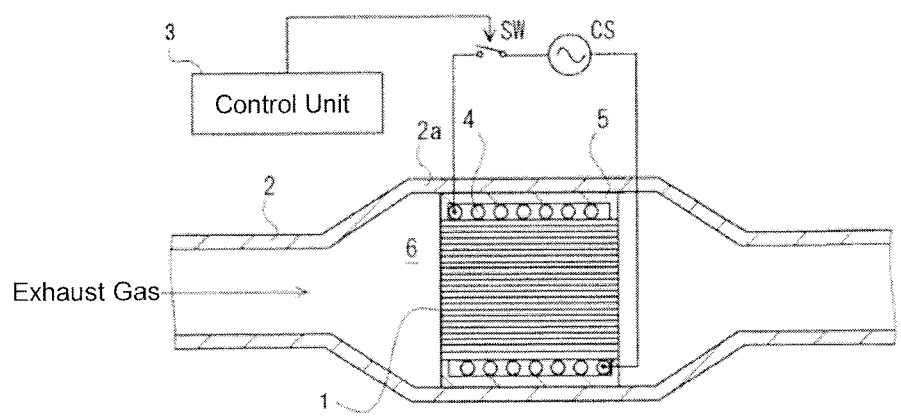
FIG. 7 is a schematic view of an exhaust gas flow path of an exhaust gas purifying device incorporating a honeycomb structure.

Using the honeycomb structure according to each embodiment of the present invention as described above, an exhaust gas purifying device can be formed. As an example, FIG. 7 shows a schematic view of an exhaust gas flow path of an exhaust gas purifying device 6 including the honeycomb structure 1. The exhaust gas purifying device 6 includes the honeycomb structure 1 and a coil wiring 4 that spirally surrounds the outer circumference of the honeycomb structure 1. Also, the exhaust gas purifying device 6 has a metal pipe 2 for housing the honeycomb structure 1 and the coil wiring 4. The exhaust gas purifying device 6 can be arranged in an increased diameter portion 2a of the metal pipe 2. The coil wiring 4 may be fixed to the interior of the metal pipe 2 by a fixing member 5. The fixing member 5 is preferably a heat-resistant member such as ceramic fibers. The honeycomb structure 1 may support a catalyst.

The coil wiring 4 is spirally wound around the outer circumference of the honeycomb structure 1. It is also assumed that two or more coil wirings 4 are used. An AC current supplied from an AC power supply CS flows through the coil wiring 4 in response to turning on (ON) of a switch SW, and as a result, a magnetic field that periodically changes is generated around the coil wiring 4. The on/off of the switch SW is controlled by a control unit 3. The control unit 3 can turn on the switch SW in synchronization with the start of an engine and pass an alternating current through the coil wiring 4. It is also assumed that the control unit 3 turns on the switch SW regardless of the start of the engine (for example, in response to an operation of a heating switch pushed by a driver).

In the present disclosure, a temperature of the honeycomb structure 1 is increased in response to the change of the magnetic field according to the alternating current flowing through the coil wiring 4. Based on this, carbon fine particles and the like collected by the honeycomb structure 1 are burned out. Also, when the honeycomb structure 1 supports the catalyst, the increase in the temperature of the honeycomb structure 1 raises a temperature of the catalyst supported by the catalyst support contained in the honeycomb structure 1 and promotes the catalytic reaction. Briefly, carbon monoxide (CO), nitrogen oxide ($NO_x$), and hydrocarbon (CH) are oxidized or reduced to carbon dioxide ($CO_2$), nitrogen ($N_2$), and water ($H_2O$).

DESCRIPTION OF REFERENCE NUMERALS

1, 20 honeycomb structure
2 metal tube
3 control unit
4 coil wiring
5 fixing member
6 exhaust gas purifying device
11 outer peripheral wall
12 partition wall
13, 14 end face
15 cells (cell A+cell B)
19 plugged portion
21 magnetic particle
22 particle forming collecting layer
23 collecting layer
24 heat insulating layer

The invention claimed is:

1. A pillar shaped honeycomb structure, comprising:
an outer peripheral wall; and
a porous partition wall disposed inside the outer peripheral wall, the porous partition wall defining a plurality of cells, each of the cells extending from one end face to other end face to form a flow path,
wherein a surface of the porous partition wall in the cells comprise a collecting layer having an average pore diameter lower than that of the porous partition wall; and
wherein magnetic particles having a Curie point of 700° C. or higher are provided either or both between the surfaces of the porous partition wall and the collecting layer, and on the collecting layer,
the collecting layer has a porosity of 40 to 80%,
the collecting layer has an average pore diameter of 1 to 10 μm,
the collecting layer has a thickness of 10 to 80 μm,
a volume ratio of the magnetic particles is 1 to 30% to the total volume of the outer peripheral wall and the partition walls of the honeycomb structure,
the pillar shaped honeycomb structure further comprises a heat insulating layer having a thermal conductivity lower than that of the collecting layer or the porous partition wall between the surface of the porous partition wall in the cells and the collecting layer,
the porous partition wall is made of at least one, two or more materials selected from alumina ($Al_2O_3$), MgO, cordierite ($2MgO \cdot 2SiO_2 \cdot 5SiO_2$), silicon carbide (SiC), aluminum titanate ($Al_2O_3 \cdot TiO_2$), silicon nitride ($Si_3N_4$), mullite ($3Al_2O_3 \cdot 2SiO_2$), a silicon-silicon carbide-based composite material, and silicon carbide-cordierite based composite material, and
the heat insulating layer is made of at least one, two or more materials selected from $ZrO_2$, $SiO_2$, $TiO_2$, and glass.

2. The honeycomb structure according to claim 1, wherein the magnetic particles have a volume-based average particle diameter D50 of 10 to 3000 μm.

3. The honeycomb structure according to claim 1, wherein the magnetic particles comprise at least one element selected from the group comprising Fe, Co, or Ni.

4. The honeycomb structure according to claim 1, wherein surfaces of the magnetic particles are coated with a protective layer.

5. The honeycomb structure according to claim 1, wherein the collecting layer comprises a compound containing an oxide of at least one, two or more elements selected from the group comprising Si, Al, Mg, or Ti.

6. The honeycomb structure according to claim 1, wherein the collecting layer has a heat conductivity lower than that of the porous partition wall.

7. The honeycomb structure according to claim 1, wherein the heat insulating layer has a porosity higher than that of the collecting layer and is 60 to 98%.

8. The honeycomb structure according to claim 1, wherein the heat insulating layer has an average pore diameter lower than that of the porous partition wall and is 0.005 to 1 µm.

9. The honeycomb structure according to claim 1, wherein the outer peripheral wall comprises a ceramic material.

10. The honeycomb structure according to claim 9, wherein the ceramic material comprises a compound containing at least one, two or more elements selected from the group comprising Si, Al, or Mg.

11. The honeycomb structure according to claim 1, wherein the cells comprise:
a plurality of cells A which are opened on the one end face side and have plugged portions on the end face on the other end face side; and
a plurality of cells B which are arranged alternately with the cells A, and which are opened on the other end face side and have plugged portions on the end face on the one end face side.

12. An exhaust gas purifying device, comprising:
the honeycomb structure according to claim 1;
a coil wiring that spirally surrounds an outer circumference of the honeycomb structure; and
a metal pipe for housing the honeycomb structure and the coil wiring.

* * * * *